United States Patent
Summers

(10) Patent No.: US 12,016,274 B2
(45) Date of Patent: Jun. 25, 2024

(54) ROOT IRRIGATION SYSTEM

(71) Applicant: Robert G Summers, Pasadena, CA (US)

(72) Inventor: Robert G Summers, Pasadena, CA (US)

(*) Notice: Subject to any disclaimer, the term of this patent is extended or adjusted under 35 U.S.C. 154(b) by 30 days.

(21) Appl. No.: 17/881,514

(22) Filed: Aug. 4, 2022

(65) Prior Publication Data
US 2023/0040694 A1    Feb. 9, 2023

Related U.S. Application Data

(60) Provisional application No. 63/229,985, filed on Aug. 5, 2021.

(51) Int. Cl.
*A01G 25/06* (2006.01)

(52) U.S. Cl.
CPC ..................... *A01G 25/06* (2013.01)

(58) Field of Classification Search
CPC ................ A01G 25/06; A01G 25/02
See application file for complete search history.

(56) References Cited

U.S. PATENT DOCUMENTS

| | | | | |
|---|---|---|---|---|
| 3,387,786 A * | 6/1968 | Rynberk | ................. | B05B 1/20 47/33 |
| 3,415,013 A * | 12/1968 | Galbraith | ................. | A01G 9/28 47/33 |
| 3,485,449 A * | 12/1969 | Wilson | ................. | A01G 25/00 47/33 |
| 5,106,235 A * | 4/1992 | King | ................. | F16L 9/12 47/33 |
| 5,232,159 A * | 8/1993 | Abbate, Sr. | ................. | B05B 15/622 239/276 |
| 5,274,969 A * | 1/1994 | Kazakidis | ................. | A01G 9/28 47/33 |
| 5,519,970 A * | 5/1996 | Reum | ................. | A01G 9/28 47/33 |
| 5,768,824 A * | 6/1998 | Matz | ................. | A01G 9/28 47/33 |
| 5,857,493 A * | 1/1999 | Matz | ................. | F21V 21/0824 47/33 |
| 6,138,405 A * | 10/2000 | Matz | ................. | F21V 21/0824 47/33 |
| 6,253,486 B1 * | 7/2001 | Prassas | ................. | A01G 9/28 47/33 |
| 6,341,445 B1 * | 1/2002 | Morrison | ................. | A01G 9/28 47/33 |
| 6,449,897 B1 * | 9/2002 | Gaston | ................. | A01G 9/28 47/33 |
| 6,619,565 B1 * | 9/2003 | Abbott | ................. | A01G 25/02 47/33 |
| D514,714 S * | 2/2006 | Jones | ................. | D25/164 |

* cited by examiner

*Primary Examiner* — Monica L Perry
*Assistant Examiner* — Aaron M Rodziwicz

(57) ABSTRACT

A root irrigation system includes a first polygonal shaped pipe having a first blade shaped bottom, a first elongated body having a first end and a second end, and a first chamber within the first polygonal shaped pipe configured to permit fluid flow from the first end to the second end. The root irrigation system further includes a fitting configured to operably couple to the first end of the first polygonal shaped pipe.

20 Claims, 14 Drawing Sheets

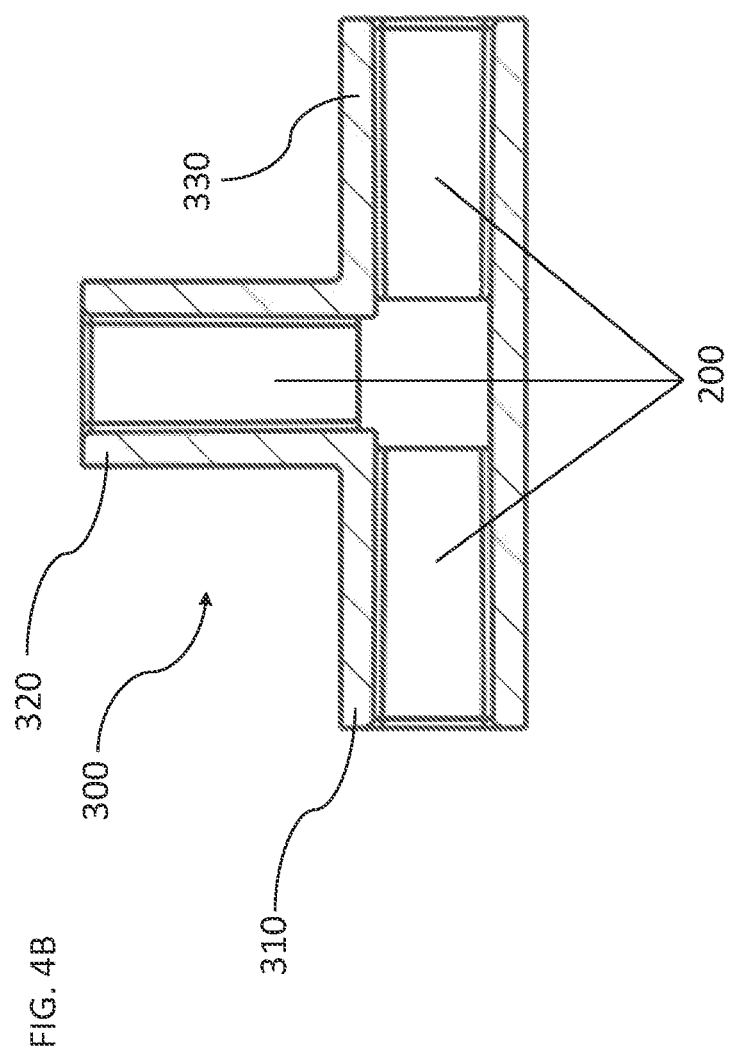

ROOT IRRIGATION SYSTEM

CROSS REFERENCE TO RELATED APPLICATION

This application claims the benefit of U.S. Provisional Application Ser. No. 63/229,985 filed Aug. 5, 2021, the entirety of which is incorporated by reference herein.

TECHNICAL FIELD

Embodiments of the present disclosure relate to the field of water irrigation and, more particularly, to a deep watering system for lawns, grasses, flower and vegetable beds, and other plants that minimizes evaporation and runoff.

BACKGROUND OF THE INVENTION

Generally, there are three types of irrigation methods: sprinklers, drip irrigation and soakers. Sprinklers require the use of devices that are above the surface and may require strong water pressure in order to effectively water the desired area. Unfortunately, a lot of water may be wasted due to evaporation or misaligned sprinkler heads that spray outside the desired zone.

"Drip irrigation" is commonly used to describe systems that water plants individually. Traditional drip irrigation systems may operate in long cycle times, 30-45 minutes per cycle, and are prone to about 10-15% evaporation of the water delivered during a cycle. Drip irrigation systems, and related "soaking" systems, may include soaking hoses and/or drip irrigation heads. Unfortunately, soaking systems are just as prone to evaporation and misdirected irrigation as other drip irrigation systems if not properly maintained.

Currently available irrigation systems typically provide for above-ground watering, and there is not a widely used strategy on the market for subsurface drip pipe to be installed in new lawns subsurface because there are significant maintenance issues, and it generally requires putting in a new lawn.

Moreover, currently offered irrigation systems may require the user to choose sprinklers, drip irrigation, or soakers which may result in a less efficient watering system that may waste water due to evaporation or runoff. And, further limiting the efficacy of currently offered irrigation systems, the standard PVC pipe and other drip lines used may have a limited diameter which can restrict the irrigation system in terms of water delivery rate. These systems can also be prone to clogging and damage when the components are exposed above ground Embodiments of the present disclosure may obviate the need for the user to install the currently offered irrigation systems because some embodiments of the present disclosure may deliver a high volume of water to the root of the tree, shrub, bush, or any other plant that may consume water in a subterraneous manner.

Aspects of some embodiments of the present disclosure may thus provide the benefits of watering the root of the tree, shrub, bush, lawns, flower beds, or any other plant or vegetation that may require water while reducing evaporation or runoff and delivering a sufficiently high volume of water in less time thereby conserving water.

SUMMARY OF THE INVENTION

One or more embodiments of the present disclosure may be directed to a root irrigation system.

A root irrigation system includes a first polygonal shaped pipe having a first blade shaped bottom, a first elongated body having a first end and a second end, and a first chamber within the first polygonal shaped pipe configured to permit fluid flow from the first end to the second end, and a fitting configured to operably couple to the first end of the first polygonal shaped pipe.

The root irrigation system may further include a second polygonal shaped pipe having a second blade shaped bottom, a second elongated body having a third end and a fourth end, and a second chamber within the second polygonal shaped pipe configured to permit fluid flow from the third end to the fourth end, wherein the fitting is configured to communicably connect the first chamber of the first polygonal shaped pipe at the first end to the second chamber of the second polygonal shaped pipe at the third end.

The root irrigation system may have the fitting include a first arm configured to operably couple to the first end, and a second arm configured to operably couple to the third end, such that the first arm is oriented at an approximately 90-degree angle relative to the second arm.

The root irrigation system may further include an endcap configured to operably couple to the second end.

The root irrigation system may further include an endcap configured to operably couple to the fourth end.

The root irrigation system may further include an NPT cap configured to operably couple to the first end.

The root irrigation system may have the NPT cap include a port, and a threaded portion configured to operably couple to the port and permit fluid flow through the port.

The root irrigation system may have the first polygonal shaped pipe further include an irrigation aperture.

The root irrigation system may have the first polygonal shaped pipe include 5-sides forming an irregular pentagonal cross-section.

A modular root irrigation system includes a plurality of polygonal shaped pipes, each of the plurality of polygonal shaped pipes having a first end and a second end, an angular fitting configured to operably connect two or more of the plurality of polygonal shaped pipes, an endcap configured to operably couple to one of the plurality of polygonal shaped pipes and prevent fluid transmission out of the second end of the operably coupled one of the plurality of polygonal shaped pipes, and an NPT cap having a port, the NPT cap being configured to operably couple to the first end of one of the plurality of polygonal shaped pipes and permit fluid flow through the port.

The modular root irrigation system may have each one of the plurality of polygonal shaped pipes include a blade shaped bottom portion, and a plurality of irrigation apertures.

The modular root irrigation system may have the angular fitting configured to orient the two or more of the plurality of polygonal shaped pipes with an approximately 90-degree angle between any two adjacent polygonal shaped pipes of the of the plurality of polygonal shaped pipes operably coupled to the angular fitting.

The modular root irrigation system may have the port include a threaded portion.

The modular root irrigation system may have the plurality of irrigation apertures of each of the plurality of polygonal shaped pipes arranged in regular intervals.

The modular root irrigation system may have the blade shaped bottom portion of each of the plurality of polygonal shaped pipes include a first side, a second side, and a vertex connecting the first side and second side at an acute angle.

The modular root irrigation system may further include a coupling configured to operably connect one of the plurality of polygonal shaped pipes with another one of the plurality of polygonal shaped pipes in an approximately colinear orientation.

A root irrigation apparatus includes a polygonal shaped pipe having a plurality of sides surrounding a chamber, a plurality of irrigation apertures, and a pair of adjacent vertices each having an approximately 90-degree angle.

The root irrigation apparatus may have the plurality of sides surrounding the chamber include 5 sides forming an irregular pentagonal cross-section for the polygonal pipe.

The root irrigation apparatus may have the polygonal shaped pipe include polyvinyl chloride (PVC).

The root irrigation apparatus may have the plurality of irrigation apertures located in regular intervals along at least one side of the polygonal shaped pipe.

Problems that are to be Solved by the Invention

As mentioned previously, currently offered irrigation systems may require the user to choose sprinklers, drip irrigation, or soakers. The use of these devices may result in a less efficient watering system that wastes water due to evaporation or runoff. Traditional irrigation systems are also prone to damage, frequent maintenance, and long cycle times for watering. Additionally, the standard PVC pipes used in some of these systems may limit the rate at which water can be delivered by the irrigation system. Therefore, there is a need for a root irrigation system that can deliver water, or other fluids, to a root system using subterraneous components and installation that avoids above-ground fluid exposure, that results in evaporation and/or runoff, and reduces the frequency of maintenance required for the system.

Means for Solving the Problem

Some embodiments of the present disclosure may obviate the need for the user to rely on the current offering of irrigation systems because some embodiments of the present disclosure may deliver water to the roots of a tree, shrub, bush, or any other plant that may require water. Some embodiments of the present disclosure may deliver water to the soil beneath the surface of the ground and thereby avoid waste created by evaporation and runoff.

Effects of the Invention

Some embodiments of the present disclosure may provide the benefits of delivering a sufficiently large volume of water, or other fluids, to the root of the tree, shrub, bush, or any other plant that may consume water while conserving water by preventing evaporation and/or runoff.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 4B is a cross-sectional view of an alternative embodiment of a fitting according to some aspects of the present disclosure;

DETAILED DESCRIPTION

Figure 1:
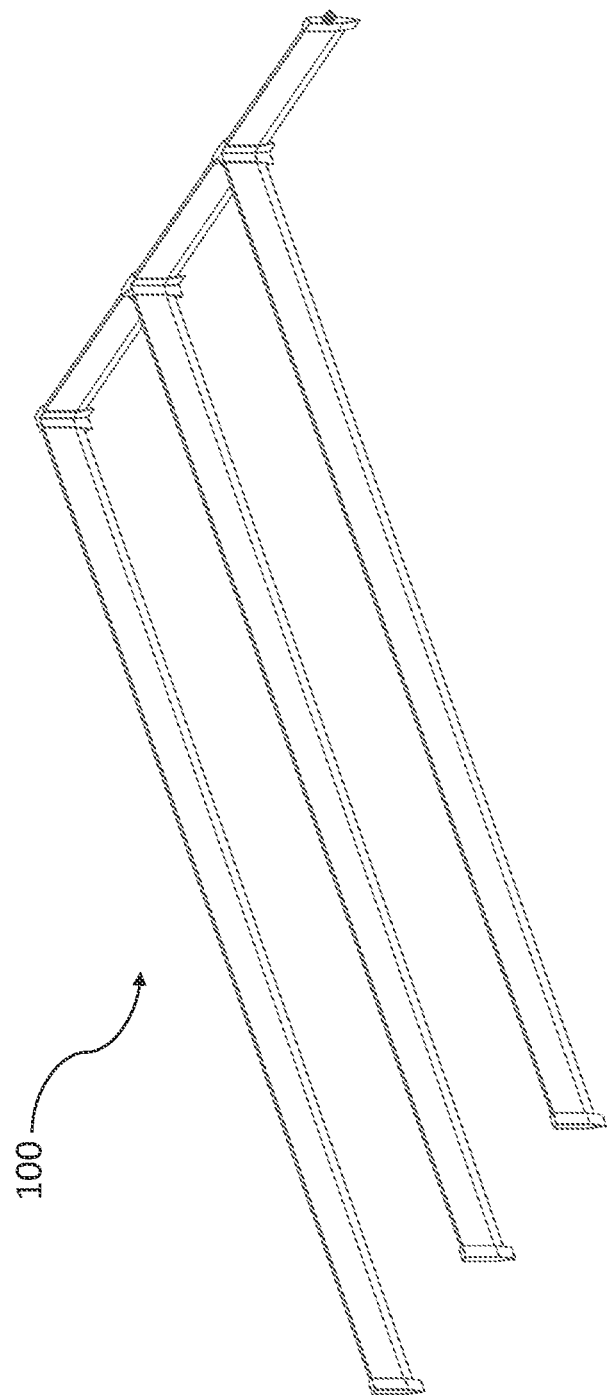
FIG. 1 is a perspective view of an embodiment of a root irrigation system according to some aspects of the present disclosure.

Aspects of embodiments of the present disclosure may be understood more readily by reference to the following detailed description of embodiments and the accompanying drawings. An inventive concept of one or more embodiments of the present disclosure may, however, be embodied in many different forms and should not be construed as being limited only to the embodiments set forth herein. Rather, these embodiments are provided as examples so that this disclosure will be thorough and complete, and will fully convey the aspects and features of embodiments of the present disclosure to those skilled in the art. Accordingly, processes, elements, and techniques that are not necessary to those having ordinary skill in the art for a complete understanding of the aspects and features of embodiments of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the embodiments disclosed herein in use or in operation, in addition to the orientation depicted in the figures. For example, if the embodiment in the figures is turned over, elements described as "below" or "beneath" or "under" other elements or features would then be oriented "above" the other elements or features. Thus, the example terms "below" and "under" can encompass both an orientation of above and below. The embodiments may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

For the purposes of this application, the words tree, plant, shrub, or bush may be understood to be interchangeable with each other, unless otherwise specified. Moreover, the words "polygonal shaped pipe" and "pipe" may be interchangeable with each other, unless otherwise specified. In addition, the words "water" and "fertilizer" may be interchangeable with each other, unless otherwise specified. In general, the use of the word water is used to illustrate the function of the invention is not meant to limit the liquid that passes through the pipes and/or system. Likewise, the terms "thread" and "threaded portion" may be interchangeable with each other, unless otherwise specified. One or more embodiments according to the present disclosure will now be described in detail. As described previously, a user may choose to use sprinklers, drip irrigation, or soakers to irrigate trees or other plants, but these offerings may result in inefficient irrigation systems that waste water due to evaporation or runoff. Use of a root irrigation system according to some aspects of embodiments of the present disclosure may obviate the need for the user to deploy the current offering of irrigation systems because embodiments of the present disclosure may deliver water in a subterraneous manner to the root of the tree, shrub, bush, or any other plant that may consume water. Some embodiments of the present disclosure may thus provide the benefits of watering the root of a tree, shrub, bush, or any other plant that may require water while conserving water by preventing evaporation and/or runoff. Additionally, some embodiments of a blade irrigation system according to the present disclosure may deliver a larger volume of water in a shorter amount of time to a root system of a plant or lawn.

Modular Root Irrigation System

The blade irrigation system of the present disclosure may, in some embodiments, be a modular system including polygonal shaped pipes, fittings, couplings, endcaps, and NPT caps. In some embodiments, the root irrigation system of the present disclosure may be installed just under the surface of the ground and in proximity to a root system that requires irrigation. Unlike drip systems, the root irrigation system of the present disclosure may, in some embodiments, provide water or other fluids to the soil under the ground and at higher pressures to aid in aeration, watering, and fertilizing.

FIG. 1 is a perspective view of an embodiment of a root irrigation system 100 according to some aspects of the present disclosure. As depicted in the figure, the modular root irrigation system 100 of the present disclosure can be, in some embodiments, assembled to include additional components to extend the area over which the root irrigation system 100 can deliver irrigation. The individual components are described in the following sections.

According to some aspects of embodiments of the present disclosure, the root irrigation system 100 can be modular, in that a variable number of components may be included within the root irrigation system 100 to adapt to a specific use case. For example, in a non-limiting embodiment where the modular root irrigation system 100 is laid out in a branched pattern, with each section extending from the previous section at about an angle of 0, 90, 180, or 270 degrees, the area covered by the modular root irrigation system 100 can be varied by adding additional components. Furthermore, in some embodiments, the root irrigation system 100 may include 8' lengths of polygonal shaped pipes that are designed for installation under the ground alongside fittings, couplers, endcaps, and NPT caps for connection to existing irrigation systems. In some embodiments, the polygonal shaped pipes may be cut by a user and coupled together at various lengths via fittings and couplings to create a grid of polygonal shaped pipes to deep water lawns, flower beds and vegetable gardens.

As will be appreciated by one skilled in the art, the individual components of the modular root irrigation system 100 according to the present disclosure—polygonal shaped pipes, fittings, couplings, endcaps, and NPT caps—may be made of polyvinyl chloride (PVC) or any other material known to be suitable for irrigation systems. These materials may include, but are not limited to, PVC plastic, ABS, rigid or flexible vinyl, biodegradable plastic, metal, molded, stamped, forged, cast, printed or made by any other method. Furthermore, in some embodiments, any of the components may include a surface treatment or coating having any composition known by one skilled in the art to be useful for preventing wear, corrosion, or mitigating root growth along the surface of the component. These coatings may include, but are not limited to, copper metal oxides, copper sulfides/sulfates, copper phosphates, ceramic coatings, and various other metal platings.

Polygonal Shaped Pipes

A root irrigation system 100 according to some aspects of the present disclosure may, in some embodiments, have a polygonal shaped pipe configured to be operably placed approximately beneath the surface of the ground or soil and approximately adjacent to the roots of a plant or lawn.

Figure 2A:
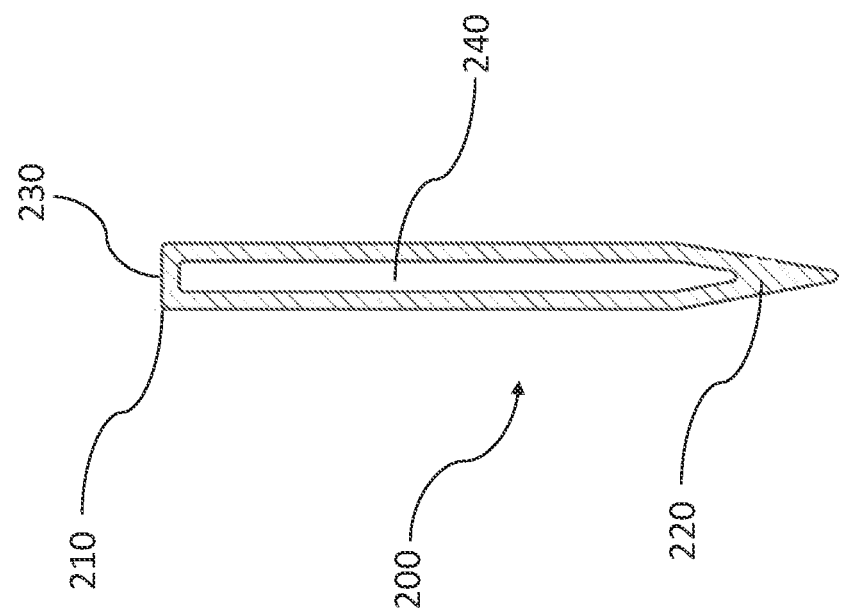
FIG. 2A is a cross-sectional view of an embodiment of a polygonal shaped pipe according to some aspects of the present disclosure.

FIG. 2A is a cross-sectional view of an embodiment of a polygonal shaped pipe 200 according to some aspects of the present disclosure. As will be understood by one skilled in the art, various polygonal shapes may be used for the polygonal shaped pipe 200 within the scope of the present disclosure.

This may include, but is not limited to, 5-sided polygonal shapes, as depicted in FIG. 2A. The polygonal shaped pipe 200 may, in some embodiments, have an irregular pentagonal shape having a pair of approximately 90-degree vertices 210. However, as will be appreciated by one skilled in the art, the polygonal shaped pipe 200 may have any number of sides and vertices with various angles. Likewise, any suitable variations of regular and irregular polygonal shapes may be used within the scope of the present disclosure.

Furthermore, in some embodiments, the polygonal shaped pipe may have two adjacent sides connected at a vertex having an acute angle. In such embodiments, this vertex, as it runs the length of the polygonal shaped pipe, may form a blade or blade-like bottom portion 220 for the polygonal shaped pipe. The blade-like bottom portion 220 may, in some embodiments, be narrow or wide. The blade-like bottom portion 220 may assist in the installation of the polygonal shaped pipe in the ground by displacing soil.

Additionally, in some other embodiments, the polygonal shaped pipe may include a substantially flat top side 230 opposite the blade-like bottom portion 220, as depicted in FIG. 2A. The top side 230 may, in some embodiments, be narrow and rectangular in shape. The top side 230, in some other embodiments, may be wide or any other shape.

Within the polygonal shaped pipe, there may, in some embodiments, be a hollow chamber 240. According to some aspects of the present disclosure, water or other fluids may pass through the hollow chamber 240, also referred to herein as a channel 240. As will be appreciated by one skilled in the art, the geometry and dimensions of the chamber 240 may be varied to meet different irrigation system needs, and all polygonal or rounded geometries and all diameters or widths of the chamber 240 that may be suitable for irrigation purposes are within the scope of the present disclosure.

The polygonal shaped pipe may, in some embodiments, keep the profile of the polygonal shaped pipe in the ground as narrow as possible while delivering at least 2 levels of watering to grass roots that typically ground down to 5 inches. Some embodiments of the polygonal shaped pipe may have, when installed, watering levels, i.e., apertures (250 of FIG. 2B) for delivering fluids, at about 1" below the surface and at about 3.5" below the surface. However, as will be appreciated by one skilled in the art, the depths of the watering levels can be varied based on the sizing of the polygonal shaped pipe 200, the placement and/or arrangement of the apertures (250 of FIG. 2B), and the installation depth of the root irrigation system 100. As such, sizing of the polygonal shaped pipe 200 to include depths from 1" to 2' are within the scope of the present disclosure, as are installation depths ranging from 1" to several feet.

The apertures (250 of FIG. 2B) may, in some embodiments, have emitters that may be installed by the user. In some embodiments, the emitters may be threaded into one or more apertures (250 of FIG. 2B) to regulate fluid flow and/or prevent backflow.

As a non-limiting example, for an embodiment of the polygonal shaped pipe 200 that has apertures (250 of FIG. 2B) located on opposing lateral sides of the polygonal shaped pipe 200, a user may place an emitter within each of the apertures (250 of FIG. 2B) located on one lateral side of the polygonal shaped pipe 200 to restrict or redirect flow to only the opposite lateral side. The emitters, in some embodiments, may thus provide a user with increased control over the location of fluid delivery by the root irrigation system 100. Moreover, as will be appreciated by one skilled in the art, any combination of apertures (250 of FIG. 2B) can be used in conjunction with the corresponding number of emitters to control fluid delivery more finely, and all permutations of these combinations are within the scope of the present disclosure.

The emitters may, in some other embodiments, be bi-directional and/or single-directional depending on the needs of the user. As noted above, the emitters may, in some embodiments, include a coating or plating of various metal oxides, sulfides/sulfates, and/or phosphates.

The polygonal shape pipe 200 may, in some embodiments, allow for easier installation with less damage to existing grass than currently offered irrigation systems by minimizing the amount of soil that has to be displaced during installation. The shape of the polygonal shaped pipe 200 may, in some other embodiments, allow the root irrigation 100 system to carry an increased volume of water or other fluids within a narrower trench.

Figure 2B:
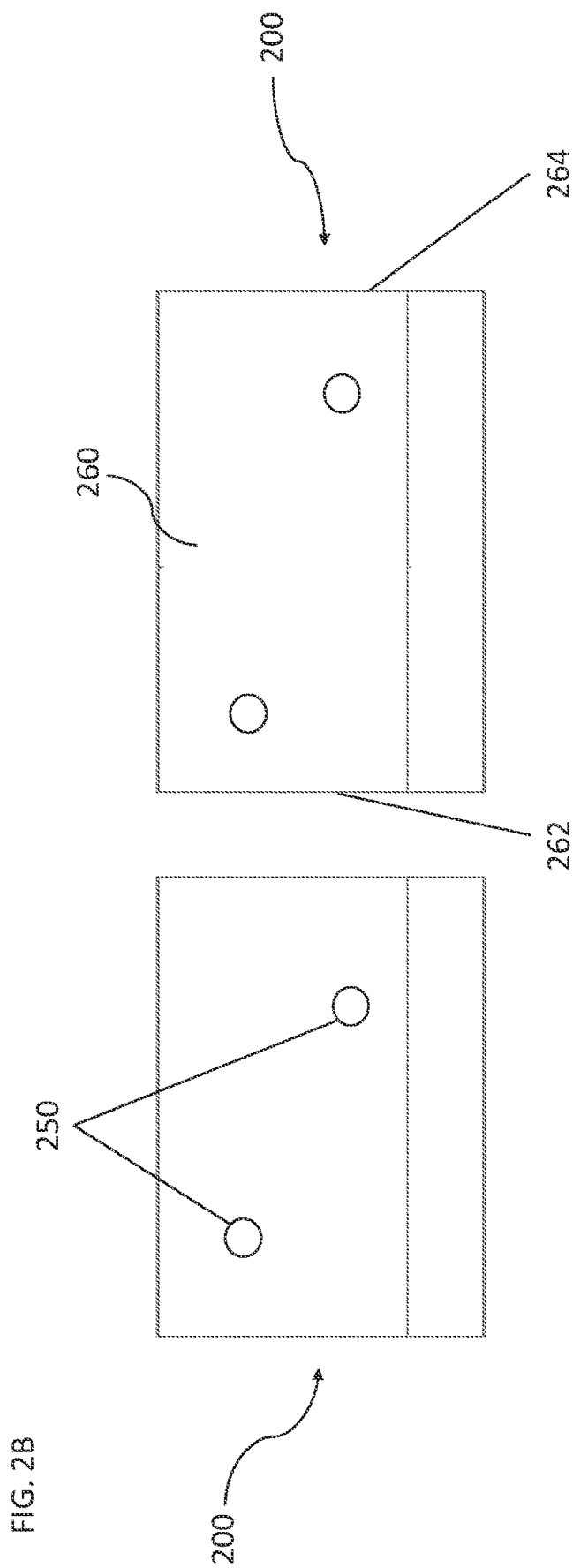
FIG. 2B is a lateral view of an embodiment of a polygonal shaped pipe according to some aspects of the present disclosure.

Turning to FIG. 2B, a lateral view of an embodiment of a polygonal shaped pipe 200, according to some aspects of the present disclosure, is depicted.

As depicted, the polygonal shaped pipe 200 may, according to some aspects of the present disclosure, have an elongated body 260 with a narrow width. The narrow width may, in some embodiments, leave a smaller footprint so that the root irrigation system 100 reduces disturbance to the existing root system of nearby plants, grass, and/or other vegetation. The elongated body 260 may, in some embodiments, have a first end 262 and a second end 264. The first end 262 may, in some other embodiments, be similarly sized and shaped relative to the second end 264. However, the scope of the present disclosure is not limited to such embodiments. For simplicity, when describing a root irrigation system 100 according to aspects of the present disclosure having more than one polygonal shaped pipe 200, the first end 262 and second end 264 of any additional polygonal shaped pipes may be referred to hereinafter as third ends and fourth ends, respectively.

Moreover, in some other embodiments, the polygonal shaped pipe may have a plurality of apertures 250, also referred to herein as holes 250, along the surface of the elongated body 260 and communicably linked to the chamber 240 (not shown) to allow water or fertilizer to irrigate the surrounding area. Alternatively, in still other embodiments, the polygonal shaped pipe 200 may have only one aperture 250 on the lateral surface, i.e., the elongated body 260 of the polygonal shaped pipe 200, to allow the water, or other fluids, to leave the root irrigation system 100 to irrigate the surrounding soil.

The polygonal shaped pipe may, in some embodiments, have a series of strategically placed apertures 250 to distribute water underground directly to the roots of lawns, grasses, flowers, and vegetables. As a non-limiting example, the apertures 250 may be arranged in a regular, i.e., repeating, pattern along the polygonal shaped pipe 200.

The apertures 250 in the polygonal shaped pipe 200 may, in some embodiments, deliver water at 6"-12" intervals and at depths from 1" to 5" on either lateral side of each polygonal shaped pipe 200 section reaching out to out to 24" due to capillary action of the water/soil. As will be appreciated by one skilled in the art, the distance from the aperture 250 that water or other fluid can be delivered via capillary action will vary according to the nature of the surrounding soil. As such, while some embodiments of the polygonal shaped pipes 200 may have apertures 250 1/16" in diameter and 12" apart that may effectively water lawns at the root system for some environments, variations in the size, number, and arrangement of the plurality of apertures 250 is contemplated within the scope of the present disclosure. As a non-limiting example, the apertures 250 may have a 1/64" to 1" diameter and be spaced at any suitable distance from one another. This may include distances up to the entire length of the root irrigation system 100, which may span several feet up to over a mile.

The root irrigation system 100 according to some aspects of the present disclosure, including the apertures 250, may also allow for constant, or nearly constant, aeration of lawns for better dirt and root health resulting from the pressurized delivery of fluids to the soil surrounding the root system of a plant or lawn.

Fittings

Figure 3A:
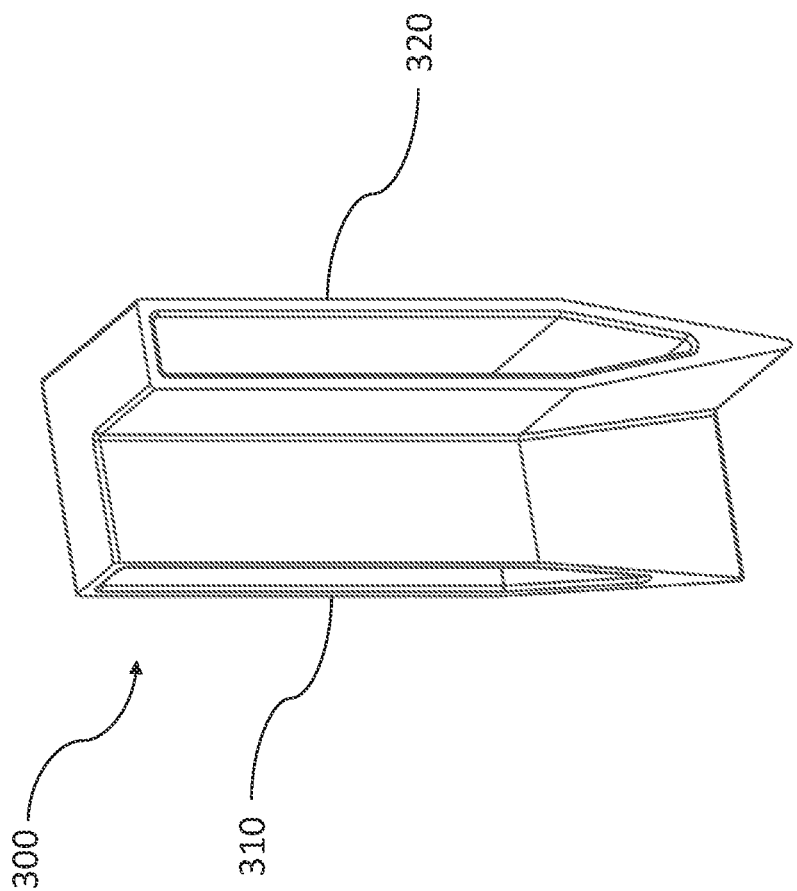
FIG. 3A is a perspective view of an embodiment of a fitting according to some aspects of the present disclosure.

FIG. 3A is a perspective view of an embodiment of a fitting 300 according to some aspects of the present disclosure.

The root irrigation system 100 of the present disclosure may, in some embodiments, include a fitting 300, alternatively referred to herein as an "angular fitting 300," configured to operably connect the first end 262 (not shown) or the second end 264 (not shown) of a first polygonal shaped pipe 200 (not shown) to the third end or fourth end of a second polygonal shaped pipe 200 (not shown) to elongate the overall length of the root irrigation system 100. The fitting 300 may be roughly the same cross-sectional shape of the polygonal shaped pipes 200 (not shown), with a suitably varied size to couple the polygonal shaped pipes 200 (not shown) to one another. The fitting 300 may couple to the polygonal shaped pipes 200 (not shown) and retain them through friction fit, threads, or any other method known by one skilled in the art to connect pipes.

According to some aspects of the present disclosure, in a root irrigation system 100 having a plurality of polygonal shaped pipes 200 (not shown), the fitting 300 may be configured to orient the two or more of the plurality of polygonal shaped pipes 200 (not shown) with an approximately 90-degree angle between any two adjacent polygonal shaped pipes 200 (not shown) of the of the plurality of polygonal shaped pipes 200 (not shown) operably coupled to the fitting 300. As a non-limiting example, a first arm 310 of the fitting 300 may be configured to operably couple to the first end 262 (not shown) of a first polygonal shaped pipe 200 (not shown), and a second arm 320 of the fitting 300 may be configured to operably couple to the third end of a second polygonal shaped pipe 200 (not shown), wherein the first arm 310 is oriented at an approximately 90-degree angle relative to the second arm 320.

As will be appreciated to one skilled in the art, a root irrigation system 100 according to the present disclosure may include fittings 300 that have a variety of angles. As a non-limiting example, the fittings 300 may range from one degree to three hundred fifty-nine degrees (1° to 359°).

Figure 3B:
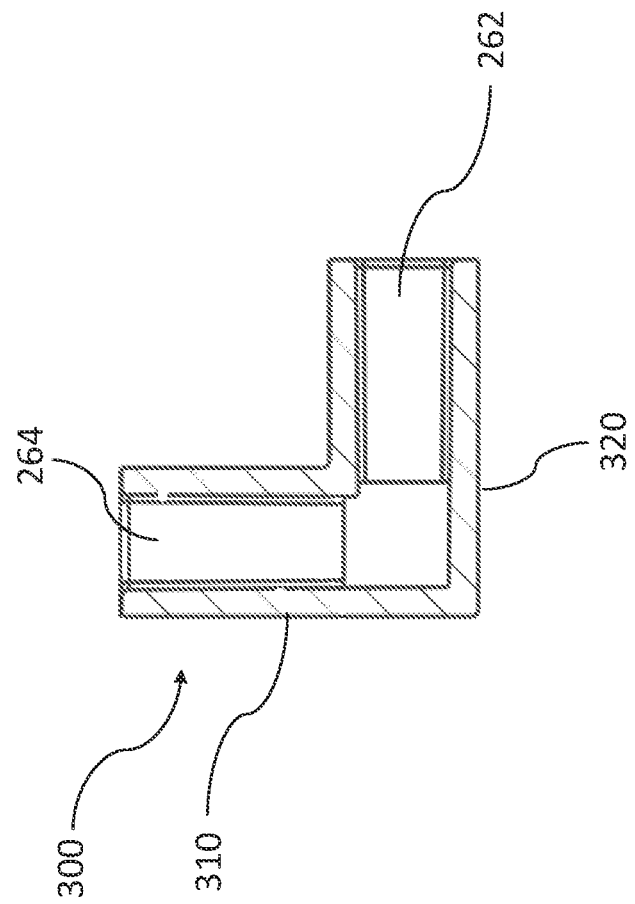
FIG. 3B is a cross-sectional view of an embodiment of a polygonal shaped pipe according to some aspects of the present disclosure.

The structure of a fitting 300 according to some aspects of the present disclosure can be further understood by viewing FIG. 3B. FIG. 3B is a cross-sectional view of an embodiment of a fitting 300 according to some aspects of the present disclosure.

Here, a first arm 310 of the fitting 300 is coupled to a second end 264 of a first polygonal shaped pipe 200. Also depicted is a second arm 320 coupled to a first end 262 of a second polygonal shaped pipe 200, with the first polygonal shaped pipe 200 and the second polygonal shaped pipe 200 oriented relative to one another at approximately 90-degrees.

As will be appreciated by one skilled in the art, a fitting 300 according to some aspects of the present disclosure may be configured to couple more than two polygonal shaped pipes 200 together at various angles. An embodiment configured to couple three polygonal shaped pipes 200 together is depicted in FIGS. 4A & 4B.

Figure 4A:
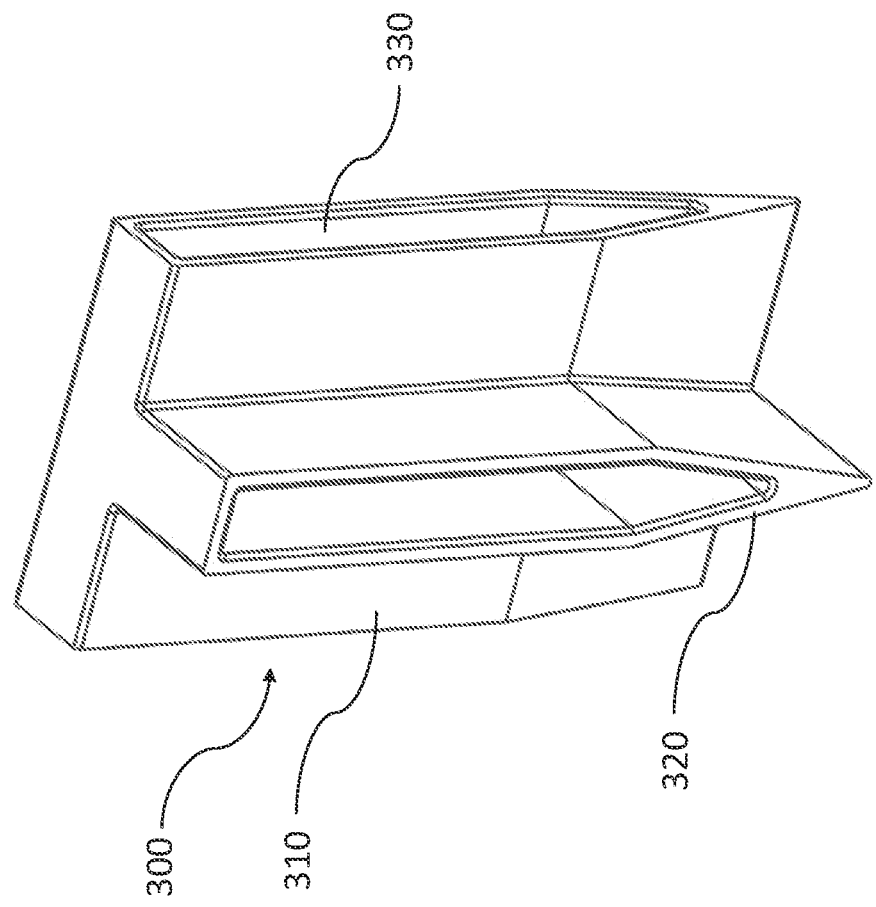
FIG. 4A is a perspective view of an alternative embodiment of a fitting according to some aspects of the present disclosure.

FIG. 4A is a perspective view of an alternative embodiment of a fitting 300 according to some aspects of the present disclosure.

Here, a third arm 330 is depicted oriented at an approximately 90-degree angle from the second arm 320 and at an approximately 180-degree angle from the first arm 310.

Turning now to FIG. 4B, a depiction of a cross-sectional view of an alternative embodiment of a fitting 300 according to some aspects of the present disclosure is shown.

Here, the cross-sectional view depicts a fitting 300 having the first arm 310, second arm 320, and third arm 330 oriented as in FIG. 4A, but with each arm coupled to a corresponding first or second end (not labeled) end of a polygonal shaped pipe 200. The sizing of the fitting 300 relative to the polygonal shaped pipes 200 can be seen in the figure, with each of the arms of the fitting 300 sized to fit an end of a polygonal shaped pipe 200 within themselves.

Couplings

In some use cases, a user may wish to extend multiple polygonal shaped pipes 200 in a colinear orientation, i.e., along the same linear path, to extend the reach of the root irrigation system 100. Accordingly, in some embodiments, a coupling may be used to couple two polygonal shaped pipes in a colinear orientation.

Figure 5A:
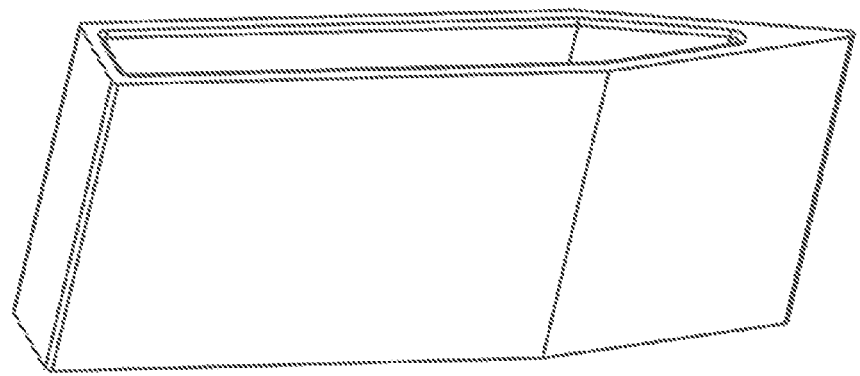
FIG. 5A is a perspective view of an embodiment of a coupling according to some aspects of the present disclosure.
Figure 5A:
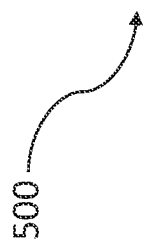

FIG. 5A is a perspective view of an embodiment of a coupling 500 according to some aspects of the present disclosure.

As shown, in some embodiments, the coupling 500 may have an overall shape similar to that of the polygonal shaped pipe 200 (not shown). However, the sizing of the coupling 500 will be different because, like the fitting 300 (not shown), the coupling is, in some embodiments, sized to retain a portion of one or more polygonal shaped pipes 200 (not shown) within its interior and form a communicable link between the polygonal shaped pipes 200 (not shown). Moreover, like the fitting 300 (not shown), the coupling 500 may be sized to retain one or more polygonal shaped pipes 200 (not shown) via a friction fit. However, as will be appreciated by one skilled in the art, various means for retaining the polygonal shaped pipes 200 (not shown) may be used within the scope of the present disclosure including but not limited to threads, adhesives, and other locking structures.

Figure 5B:
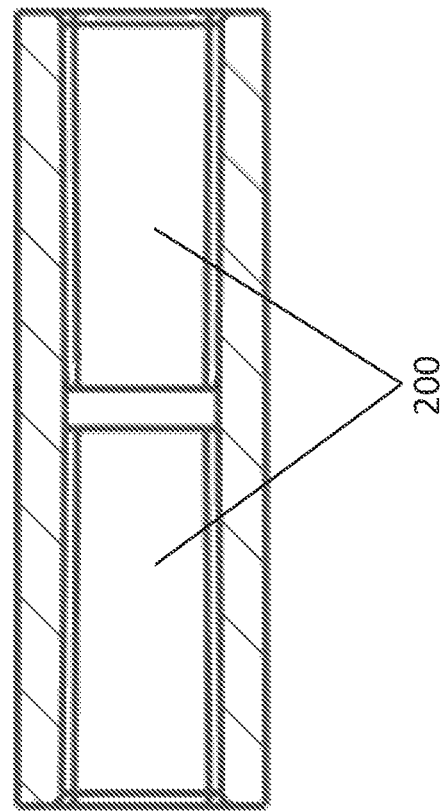
FIG. 5B is a cross-sectional view of an embodiment of a coupling according to some aspects of the present disclosure.
Figure 5B:
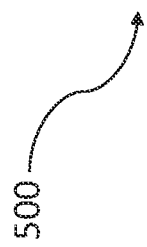

The use of the coupling 500, according to some aspects of the present disclosure, can be further understood by reference to FIG. 5B, a depiction of a cross-sectional view of an embodiment of a coupling 500 according to some aspects of the present disclosure.

Here the coupling 500 can be seen with the ends of two polygonal shaped pipes 200 retained in a colinear orientation.

Endcaps

Figure 6A:
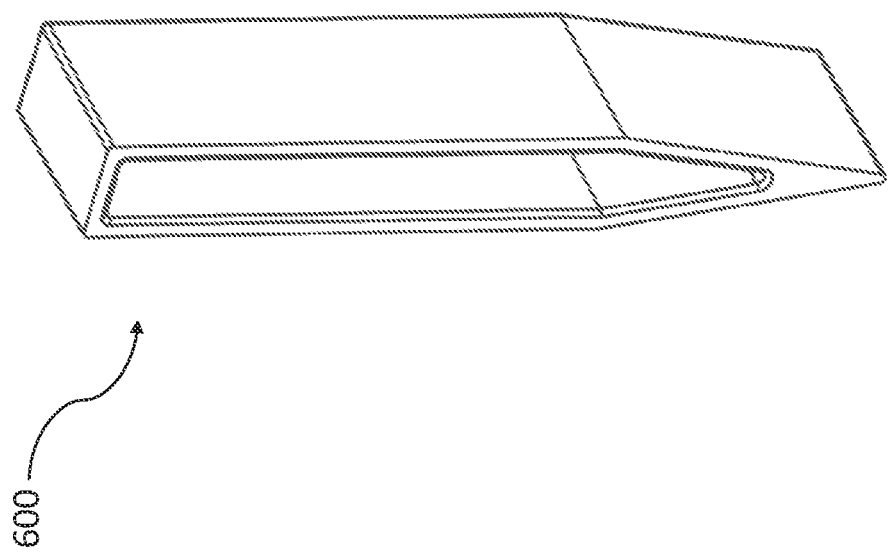
FIG. 6A is a perspective view of an embodiment of an endcap according to some aspects of the present disclosure.

FIG. 6A depicts a perspective view of an embodiment of an endcap 600 according to some aspects of the present disclosure.

The root irrigation system 100 may have an endcap 600 configured to operably connect to the second end 264 (not shown), or alternatively a fourth end, of a polygonal shaped pipe 200 (not shown), wherein the endcap 600 acts as a barrier to prevent water from releasing out of the second end 264 (not shown) of the polygonal shaped pipe 200 (not shown). The endcap 600 may attach to the second end 264 (not shown) of the polygonal shaped pipe 200 (not shown) through friction fit, threads, or any other method used to connect to pipes. When a fluid flowing through the channel 240 (not shown) progresses through the polygonal shaped pipe 200 (not shown) and reaches the endcap 600, the fluid may no longer be able to proceed and may create additional pressure in the polygonal shaped pipe 200 (not shown).

Figure 6B:
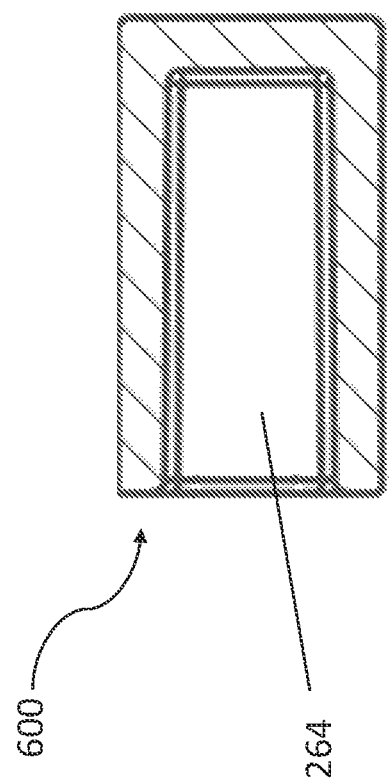
FIG. 6B is a cross-sectional view of an embodiment of an endcap according to some aspects of the present disclosure.

Turning now to FIG. 6B, a cross-sectional view of an embodiment of an endcap 600 according to some aspects of the present disclosure is shown.

Here, the endcap 600 is shown coupled to a second end 264 of a polygonal shaped pipe 200.

Npt Caps

Figure 7A:
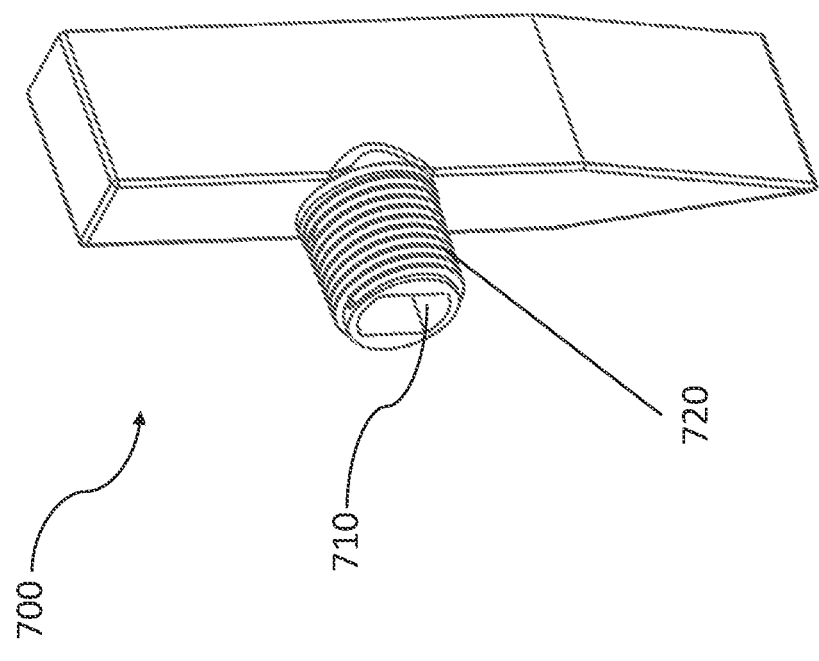
FIG. 7A is a perspective view of an embodiment of an NPT cap according to some aspects of the present disclosure.

FIG. 7A depicts a perspective view of an embodiment of an NPT cap 700 according to some aspects of the present disclosure.

The NPT cap 700 may, in some embodiments, include a port 710, also referred to herein as an opening 710, to form a communicable passageway to a device, such as a hose or tube, configured to operably connect the root irrigation system 100 to a water source. Moreover, the port 710 may, in some other embodiments, have a threaded barrel 720, also referred to herein as a threaded portion 720, configured to operably couple the NPT cap 700 to a water source via a threaded tube or hose. In addition, still other embodiments of the root irrigation system 100 may have multiple NPT caps 700 for connecting a root irrigation system 100 to an existing irrigation system at multiple points.

Figure 7B:
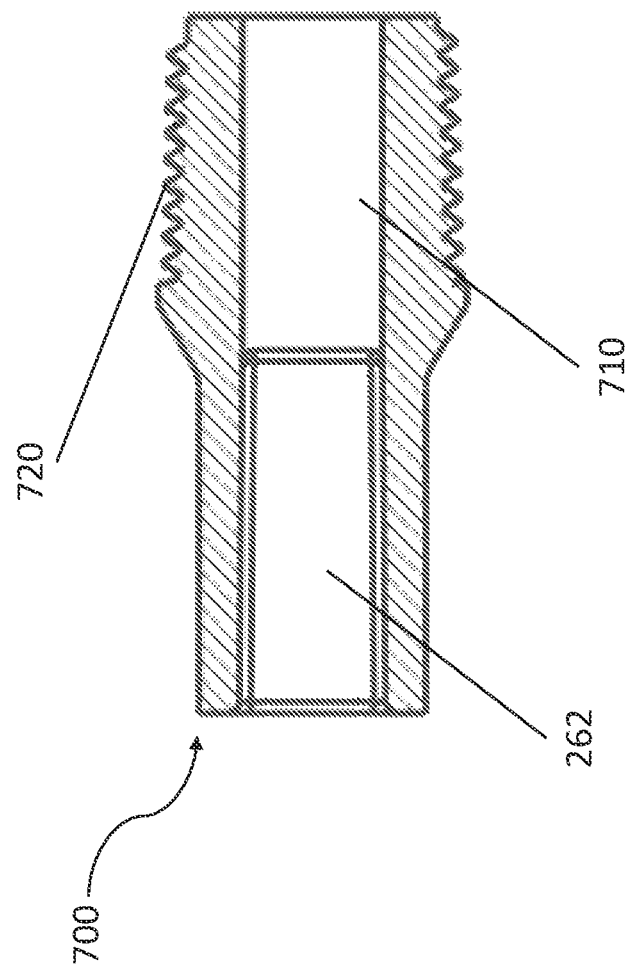
FIG. 7B is a cross-sectional view of an embodiment of an NPT cap according to some aspects of the present disclosure.

Moving to FIG. 7B, a cross-sectional view of an embodiment of an NPT cap 700 according to some aspects of the present disclosure is shown.

Similar to the sizing considerations described previously for the fitting 300 (not shown) and the endcap 600 (not shown) the NPT cap 700 may, in some embodiments, have an overall shape similar to that of a polygonal shaped pipe 200 (not labeled) but be sized to couple to a first end 262 of a polygonal shaped pipe 200 (not labeled). Here the NPT cap 700 is shown coupled to a first end 262 with the port 710 forming a communicable passage through the NPT cap 700 to the first end 710. The threaded barrel 720 is also shown as surrounding the port 710. As will be appreciated by one skilled in the art, variations in the length and geometry of the threaded barrel 720 are within the scope of the present disclosure. Likewise, as will be appreciated by one skilled in the art, any suitable structure or method for coupling the NPT cap 700 to a first end 262 may be used within the scope of the present disclosure including but not limited to threads, adhesives, and other locking structures.

Figure 7C:
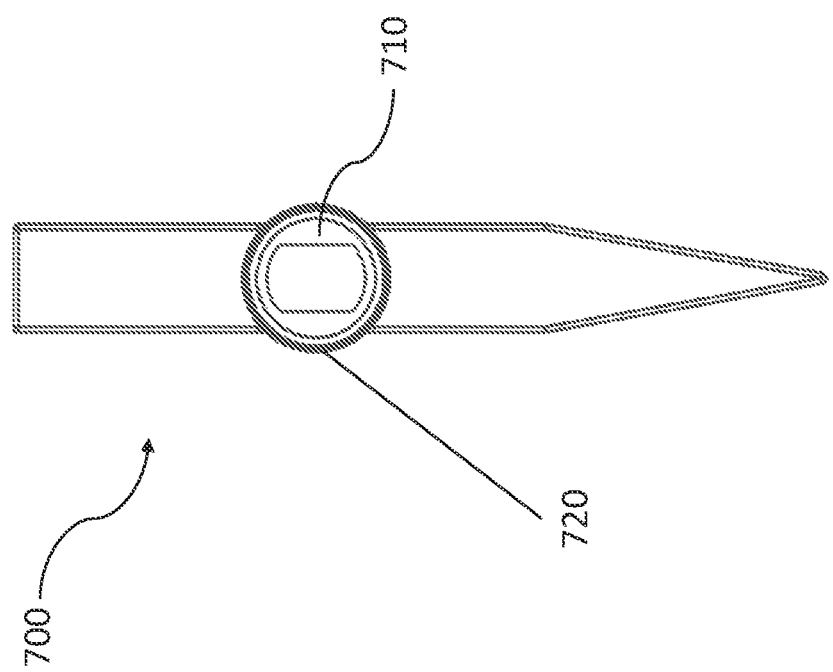
FIG. 7C is a frontal view of an embodiment of an NPT cap according to some aspects of the present disclosure.

Additional details regarding the NPT cap 700 can be seen in FIG. 7C, a frontal view of an embodiment of an NPT cap 700 according to some aspects of the present disclosure.

Here, the location of the port 710 on the NPT cap 700 can be seen. As will be appreciated by one skilled in the art, the location of the port 710 on the NPT cap 700 can be varied according to the dimensions of the chamber 240 (not shown) of the polygonal shaped pipe 200 (not shown) that the NPT cap 700 may be coupled to.

In other embodiments, the root irrigation system 100 may include a maintenance cleanout fitting to enable flushing the system to keep dirt out of the pipes. As a non-limiting example, 2 NPT caps 700 may be coupled to the root irrigation system 100, one at the supply end and one at the end of the line, i.e., at a location where an endcap 600 may otherwise be coupled to the root irrigation system 100. Monthly, or as frequently as required according to the user's needs, the user may remove any secondary NPT caps 700 coupled to the end of the line, turn on water supply connected to the root irrigation system 100, and flush out any particulates that may have been caught in the root irrigation system 100. The secondary NPT caps 700 cap may then be replaced, and the root irrigation system 100 may be clean for continued use.

Installation

The root irrigation system 100 of the present disclosure may, in some embodiments, be used in conjunction with existing sprinklers and other currently used irrigation systems and methods. The root irrigation system 100 of the present disclosure may, in some embodiments, connect to existing solenoid valves and replace all conventional spray sprinkler heads in an irrigation system to allow for complete underground watering of lawns and/or plants. The root irrigation system 100 of the present disclosure may, in some other embodiments, be modularly constructed, allowing for scaling, and customizing the layout to fit different lawn or garden shapes.

In order to install the root irrigation system 100, the user may determine the irrigation demands each bush, lawn area, and/or plant based on their root system and plan an installation of an embodiment of the root irrigation system 100 that will meet the irrigation needs of the desired area. Then the user may, in some embodiments, adjust the root irrigation system 100 to the proper depth and length. Some embodiments of the present disclosure may be adjusted so that the user may place the polygonal shaped pipes 200, fittings 300, and other components of the root irrigation system 100 at an appropriate custom depth for various plants' needs. As a non-limiting example, a larger more mature root system for certain plants may be accommodated by a deeper placement for one or more polygonal shaped pipes 200.

Once the irrigation needs have been assessed and an installation of the root irrigation system 100 planned out by the user, the user may dig a trench, having a depth corresponding to the needs of the user, and place the root irrigation system 100 in the trench wherein the depth of the polygonal shaped pipe 200 is set to be approximately below the surrounding ground.

In some embodiments, the root irrigation system 100 may come with an installation kit. The installation kit may, in some embodiments, include a trenching tool that may allow for minimal impact on installation to existing lawns. The trenching tool may, when pressure is applied by a user, create a groove or trench in the ground, cutting through the grass and soil that may, in some embodiments, allow for specialized installation just under the surface of the grass or soil.

As a non-limiting example, the trenching tool may be a two-ended shovel type tool having one end shaped like a polygonal shaped pipe 200 with blade-like portion 220 and the other end flattened to be used to tamp the polygonal shaped pipes 200 into the ground.

After placement, in some embodiments, the user may fill in the volume around the root irrigation system 100 to aid in root aeration. As will be appreciated by one skilled in the art, any suitable fill may be used within the scope of the present disclosure. This may include, but is not limited to, topsoil, mulch, and other materials suitable for allowing fluid absorption into the surrounding soil.

In some embodiments, the root irrigation system 100 may come with, as a non-limiting example, a 24" flexible hose ½" diameter that may allow the user to connect the root irrigation system 100 to an existing sprinkler system. As will be appreciated by one skilled in the art, any suitable length and diameter hose may be used within the scope of the present disclosure. The flexible hose may, in some embodiments, be coupled to an NPT cap 700 or a polygonal shaped pipe 200. The flexible hose may, in some other embodiments, be permanently affixed to the polygonal shaped pipe 200 or NPT cap 700 at the port 710. In still other embodiments, the flexible hose may be placed temporarily. In some other embodiments, there may be more than one NPT cap 700 or other connector which allows one or more flexible hoses to connect to the root irrigation system 100 at multiple points. The flexible hose may deliver the water to the root irrigation system 100 at any rate known to one skilled in the art to be suitable for irrigation purposes.

A flow control valve may, in some other embodiments, allow the user to control the flow of water both for stand-alone root irrigation systems 100 as well as in conjunction with a mixed sprinkler zone (as non-limiting examples, bubblers, spray heads and deep watering devices) to balance pressure and flow delivered by the flexible hose or any other device connecting a water supply to the root irrigation system 100. In some embodiments, the flow control valve may be operably coupled to the NPT cap 700 coupled to a polygonal shaped pipe 200 or operably coupled to a hose or tube that is operably coupled to the NPT cap 700. The flow control valve may, in still other embodiments, allow the root irrigation system 100 to be controlled by a regular sprinkler system. In some embodiments, the flow control valve may be operably coupled to the flexible hose to regulate the flow rate of water or other fluids delivered to the root irrigation system 100. In still other embodiments, the flow control valve may allow for the user to vary the amount of water delivered by the root irrigation system 100 as the plants and/or lawn irrigated by the root irrigation system 100 adapt to subterraneous watering.

Once the root irrigation system 100 is connected to an existing irrigation zone, the user may, in some embodiments, turn on the water supply to that zone and adjust the flow control valve to balance the rate of water delivery with the desired length of time for the root irrigation system 100 to be run in that irrigation zone.

The user may, in some embodiments, use the root irrigation system 100 of the present disclosure to fertilize a desired area. The root irrigation system 100 may, in some other embodiments, allow for fertilizing at the roots of a plant or lawn and may result in fertilization with minimal loss of concentration or burning of the top roots. The fertilizer may, in some other embodiments, be effectively diluted and distributed to the plants' or trees' root system by the root irrigation system 100.

The root irrigation system 100 of the present disclosure may save water by minimizing evaporation by applying the water underneath the ground, directly to the roots. Accordingly, in some embodiments, the user may run the connected irrigation zones for less time than is required for a traditional sprinkler system because the water or other fluid is being delivered directly to the roots.

The root irrigation system 100 of the present disclosure may aid in reducing weed propagation in a desired area by providing irrigation while minimizing surface water.

The root irrigation system 100 of the present disclosure may, in some embodiments, aid sprinkler systems where a user needs to water both lawns and bushes/plants with different water demands. This may be especially useful on hillsides where the slope of the hill may exaggerate issues with runoff.

It will be understood that embodiments described herein should be considered in a descriptive sense only and not for purposes of limitation. Descriptions of features or aspects within each exemplary embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims. It should be noted that although examples of the invention are set forth herein, the claims, and the full scope of any equivalents, are what define the metes and bounds of the invention.

What is claimed is:

1. A root irrigation system, comprising:
 a first convex 5-sided polygonal shaped pipe comprising:
  a first blade shaped bottom;
  a first elongated body having a first end and a second end; and
  a first chamber within the first convex 5-sided polygonal shaped pipe configured to permit fluid flow from the first end to the second end and having interior angles substantially congruent to the interior angles of the first convex 5-sided polygonal shaped pipe, and
 a fitting configured to operably couple to the first end of the first convex 5-sided polygonal shaped pipe.

2. The root irrigation system of claim 1, further comprising:
 a second convex 5-sided polygonal shaped pipe comprising:
  a second blade shaped bottom;
  a second elongated body having a third end and a fourth end; and
  a second chamber within the second convex 5-sided polygonal shaped pipe configured to permit fluid flow from the third end to the fourth end and having interior angles substantially congruent to the interior angles of the second convex 5-sided polygonal shaped pipe,
wherein the fitting is configured to communicably connect the first chamber of the first convex 5-sided polygonal shaped pipe at the first end to the second chamber of the second convex 5-sided polygonal shaped pipe at the third end.

3. The root irrigation system of claim 2, wherein the fitting comprises:
a first arm configure to operably couple to the first end; and
a second arm configured to operably couple to the third end;
wherein the first arm is oriented at an approximately 90-degree angle relative to the second arm.

4. The root irrigation system of claim 2, further comprising an endcap configured to operably couple to the fourth end.

5. The root irrigation system of claim 1, further comprising an endcap configured to operably couple to the second end.

6. The root irrigation system of claim 1, further comprising an NPT cap configured to operably couple to the first end.

7. The root irrigation system of claim 6, wherein the NPT cap comprises:
a port; and
a threaded portion configured to operably couple to the port and permit fluid flow through the port.

8. The root irrigation system of claim 1, wherein the first convex 5-sided polygonal shaped pipe further comprises an irrigation aperture.

9. The root irrigation system of claim 1, wherein the first convex 5-sided polygonal shaped pipe has 5-sides forming an irregular pentagonal cross-section.

10. A modular root irrigation system, comprising:
a plurality of convex 5-sided polygonal shaped pipes, each of the plurality of convex 5-sided polygonal shaped pipes having a first end and a second end, wherein each of the plurality of convex 5-sided polygonal shaped pipes is configured with a chamber having interior angles substantially congruent to the interior angles of the plurality of convex 5-sided polygonal shaped pipes;
an angular fitting configured to operably connect two or more of the plurality of convex 5-sided polygonal shaped pipes;
an endcap configured to operably couple to one of the plurality of convex 5-sided polygonal shaped pipes and prevent fluid transmission out of the second end of the operably coupled one of the plurality of convex 5-sided polygonal shaped pipes; and
an NPT cap having a port, the NPT cap being configured to operably couple to the first end of one of the plurality of convex 5-sided polygonal shaped pipes and permit fluid flow through the port.

11. The modular root irrigation system of claim 10, wherein each one of the plurality of convex 5-sided polygonal shaped pipes comprises:
a blade shaped bottom portion; and
a plurality of irrigation apertures.

12. The modular root irrigation system of claim 11, wherein the plurality of irrigation apertures of each of the plurality of convex 5-sided polygonal shaped pipes are arranged in regular intervals.

13. The modular root irrigation system of claim 11, wherein the blade shaped bottom portion of each of the plurality of convex 5-sided polygonal shaped pipes comprises:
a first side;
a second side; and
a vertex connecting the first side and second side at an acute angle.

14. The modular root irrigation system of claim 10, wherein the angular fitting is configured to orient the two or more of the plurality of convex 5-sided polygonal shaped pipes with an approximately 90-degree angle between any two adjacent convex 5-sided polygonal shaped pipes of the of the plurality of convex 5-sided polygonal shaped pipes operably coupled to the angular fitting.

15. The modular root irrigation system of claim 10, wherein the port comprises a threaded portion.

16. The modular root irrigation system of claim 10, further comprising:
a coupling configured to operably connect one of the plurality of convex 5-sided polygonal shaped pipes with another one of the plurality of convex 5-sided polygonal shaped pipes in an approximately colinear orientation.

17. A root irrigation apparatus, comprising:
a polygonal shaped pipe comprising:
a plurality of sides surrounding a polygonal shaped chamber;
a plurality of irrigation apertures; and
a pair of adjacent vertices each having an approximately 90-degree angle;
wherein the shapes of the polygonal shaped chamber and the polygonal shaped pipe are geometrically similar.

18. The root irrigation apparatus of claim 17, wherein the plurality of sides surrounding the polygonal shaped chamber comprises 5 sides forming an irregular pentagonal cross-section for the polygonal shaped pipe.

19. The root irrigation apparatus of claim 17, wherein the polygonal shaped pipe comprises polyvinyl chloride (PVC).

20. The root irrigation apparatus of claim 17, wherein the plurality of irrigation apertures are located in regular intervals along at least one side of the polygonal shaped pipe.

* * * * *